(12) United States Patent
Wager et al.

(10) Patent No.: US 8,644,252 B2
(45) Date of Patent: Feb. 4, 2014

(54) METHOD FOR RECOVERY FROM A FAILED HANDOVER PROCEDURE IN A TELECOMMUNICATION SYSTEM

(75) Inventors: Stefan Wager, Espoo (FI); Janne Peisa, Espoo (FI); Mats Sågfors, Kyrkslätt (FI); Johan Torsner, Masaby (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 516 days.

(21) Appl. No.: 12/438,795

(22) PCT Filed: Aug. 23, 2007

(86) PCT No.: PCT/SE2007/050569
§ 371 (c)(1),
(2), (4) Date: Feb. 25, 2009

(87) PCT Pub. No.: WO2008/024064
PCT Pub. Date: Feb. 28, 2008

(65) Prior Publication Data
US 2010/0015982 A1    Jan. 21, 2010

(30) Foreign Application Priority Data
Aug. 25, 2006    (SE) ........................ 0601767

(51) Int. Cl.
*H04W 4/00*    (2009.01)
(52) U.S. Cl.
USPC .......................... 370/331; 455/436

(58) Field of Classification Search
None
See application file for complete search history.

(56) References Cited

U.S. PATENT DOCUMENTS

| | | | |
|---|---|---|---|
| 7,583,966 B2* | 9/2009 | Haseba et al. | 455/436 |
| 2003/0189909 A1 | 10/2003 | Chao et al. | |
| 2005/0213575 A1 | 9/2005 | Shin et al. | |
| 2005/0266846 A1* | 12/2005 | Kim | 455/436 |
| 2005/0281222 A1* | 12/2005 | Ranta-Aho et al. | 370/328 |
| 2006/0126567 A1 | 6/2006 | Chao et al. | |
| 2007/0097918 A1* | 5/2007 | Cai et al. | 370/331 |
| 2008/0273454 A1* | 11/2008 | Malkamaki et al. | 370/216 |
| 2009/0069017 A1* | 3/2009 | Usuda et al. | 455/442 |

FOREIGN PATENT DOCUMENTS

| | | |
|---|---|---|
| CN | 1819692 A | 8/2006 |
| EP | 1349292 A2 | 10/2003 |

* cited by examiner

*Primary Examiner* — Chi Pham
*Assistant Examiner* — Mohammad Adhami
(74) *Attorney, Agent, or Firm* — Coats and Bennett PLLC (57) ABSTRACT

The present invention relates to a method, a user equipment and a network node in a cellular radio network. According to the method of the present invention, the network units detects a failed transmission of a handover command to the UE, which is still having a uplink channel available, and further receives a RRC message from the UE indicating the loss of a serving cell and indicating the strongest cell. The network unit prepares and initiates a new serving cell re-establishment and sends to the UE a RRC reconfiguration message. The UE can then continue normal operation in the new cell.

25 Claims, 5 Drawing Sheets

METHOD FOR RECOVERY FROM A FAILED HANDOVER PROCEDURE IN A TELECOMMUNICATION SYSTEM

TECHNICAL FIELD

The present invention relates generally to the field of cellular radio telecommunications, and, more particularly, to a method, a network node and a user equipment used for handover performance.

BACKGROUND

In the current UMTS (universal mobile telecommunication systems) specifications or the current WCDMA (wideband code division multiplexing access) specifications, a fractional dedicated physical channel (F-DPCH) is introduced in order to increase capacity in a network by reducing code usage in the downlink. This is considered especially important for low bit rate services like e.g. voice-over-IP (VoIP). However, with the introduction of the F-DPCH the signaling radio bearers (SRB) have to be mapped on the high-speed downlink shared channel (HS-DSCH) since there is no room or space for the signaling radio bearers on the F-DPCH.

In addition, downlink signaling messages on the HS-DSCH can only be transmitted from a serving HS-DSCH cell since the HS-DSCH transport channel does not support transmission from several cells i.e. does not support macro diversity. Therefore, in situations wherein fast changing propagation conditions occur e.g. due to challenging radio environment or due to high velocity of a UE, the UE may lose contact with it serving HS-DSCH serving cell before a handover command can reach the UE so that the connection will be lost. Again, this is because in current handover procedures, i.e. the SRB is mapped on the HS-DSCH, a cell change command and all other signaling and data have to be transmitted over the source cell, i.e. the HS-DSCH serving cell. If a loss of the HS-DSCH serving cell occurs, the UE has no quick means of re-accessing the network in an efficient way. The only way of recovery is in conjunction with a procedure where the UE eventually detects the loss of the uplink and/or the downlink channel synchronization. After a while the UE will transit to a RRC_idle state and will need to re-access the network. The above described procedure involves however a time consuming operation, which includes inter alia: a setup of signaling connections to a radio access network (UTRAN) and a core network (CN); an authentication; and setting up new bearers. In addition, all data in buffers will be lost.

It is thus a problem that there is no fast recovery for a UE in case of a failed handover procedure as described above. A consequence of a failed handover procedure is that the end-user quality suffers substantially since the connection outage is in the order of several seconds. For real-time services, like VoIP, the actual experience for the user is a connection loss.

An additional drawback is that when a downlink connection HS-DSCH transport channel with a HS-DSCH serving cell is lost, a UE can potentially create an increased amount of inter-cell interference in cells outside of its Active Set. This is due to that the UE remains power-controlled from the cells in the Active Set and adjusts its power-levels only to the transmission power control (TPC) commands received from the cells in the Active Set. As there is no more means for the network to update this Active Set, the UE may move far into cells which it is not power-controlled from and create in these cells a considerable amount of interference.

In the international patent application WO 2006/000876, a method and apparatus are provided for defining terminal behaviour in a case where the terminal detects that it cannot receive the HS-DSCH from a serving cell reliably when a control channel is mapped to the HS-DSCH. The terminal is autonomously moved to another protocol state.

SUMMARY

It is thus an object of the present invention to address the above mentioned problems and to provide a method, a network node and a user equipment that allow a fast recovery from a failed handover procedure and a loss of a HS-DSCH serving cell in a cellular radio communications network. In particular, it is an object of the present invention to provide solutions that deal with the case when a downlink handover command from a serving HS-DSCH cell fails to reach a UE that is still having an uplink channel available and that is applying a HS-DSCH from the HS-DSCH serving cell and performing handover to another cell in an Active Set.

According to a first aspect of the invention, the above stated problem is solved by means of a method in cellular radio communications network system comprising of cells, user equipments (UEs) and at least one network unit which is enabled to provide a HS-DSCH to the UEs. The method in accordance with the present invention comprises: detecting in a network unit, a failed transmission of a handover command transmitted on the HS-DSCH, from a HS-DSCH serving cell to a UE; receiving in the network unit, from the UE which is as mentioned above still having an uplink channel available, a radio resource control (RRC) message indicating a loss of the HS-DSCH serving cell. The RRC message, which is transmitted over the still available uplink channel, further indicates which cell in the network that the UE perceives as being the strongest downlink cell. Both the HS-DSCH serving cell and the perceived strongest downlink cell are, in accordance with the present invention, cell members in an Active Set of cells. The method further comprises initiating a new HS-DSCH serving cell re-establishment to the strongest downlink cell that has been indicated in the RRC message and transmitting a RRC reconfiguration message from the network unit to the UE. The reception of the RRC reconfiguration message will enable the UE to continue normal operation in the new HS-DSCH serving cell i.e. in the strongest HS-DSCH downlink serving cell.

According to another aspect of the present invention, the above stated problem is solved by means of a network unit in a cellular radio communications network system. The network unit is configured to provide a HS-DSCH to a UE that is being served by a HS-DSCH serving cell. According to the present invention, the network unit comprises: means for detecting that a failed transmission of a handover command transmitted on the HS-DSCH to a UE, has failed; means for receiving from the UE, which is still having a uplink channel available, a RRC message indicating a loss of the HS-DSCH and further indicating the strongest downlink cell perceived by the UE; means for initiating a new HS-DSCH serving cell re-establishment to the indicated strongest downlink cell; and means for providing a RRC reconfiguration message to the UE in order for the UE to continue normal operating in the new cell.

According to yet another aspect of the present invention, the above stated problem is solved by means of a UE in a cellular radio communications network comprising cells and at least one network unit that is enabled to provide a HS-DSCH to the UE. According to the present invention, the UE comprises: means for detecting a loss of the HS-DSCH serving cell; means for providing to the network unit in a uplink channel, a uplink RRC message indicating the loss of the serving cell and indicating the strongest downlink cell perceived by the UE; and means for receiving a RRC reconfiguration message from the network unit in order for the UE to continue normal operation.

An advantage with the present invention is that a fast recovery of a UE, that is still having a uplink channel available, is achieved when a handover command fails to reach the UE.

Another advantage with the present invention is that it reduces the inter-cell interference of UEs that have lost their HS-DSCH serving cell.

The present invention will now be described in more details by means of several embodiments and with reference to the accompanying drawings, attention to be called to the fact, however, that the following drawings are illustrative only, and that various modifications and changes may be made in the specific embodiments illustrated as described within the scope of the appended claims.

DETAILED DESCRIPTION

In the following description, for purposes of explanation and not limitation, specific details are set forth such as particular architectures, scenarios, techniques, etc. in order to provide a thorough understanding of the present invention. However, it will be apparent from the person skilled in the art that the present invention and its embodiments may be practiced in other embodiments that depart from these specific details.

The present invention is described herein by way of reference to particular example scenarios. In particular the invention is described in a non-limiting general context in relation to a WCDMA cellular radio communications network that incorporates high-speed downlink packet access (HSDPA) and a fractional dedicated physical channel (F-DPCH), to be utilized together with HSDPA, and more particularly to a recovery method for a failure in transmitting a handover command from a HS-DSCH serving cell to a UE that is applying a HS-DSCH from the HS-DSCH serving cell to another cell in an Active Set of cells. The present invention also provides a network unit and a user equipment that are involved in the above mentioned recovery method.

Figure 1:
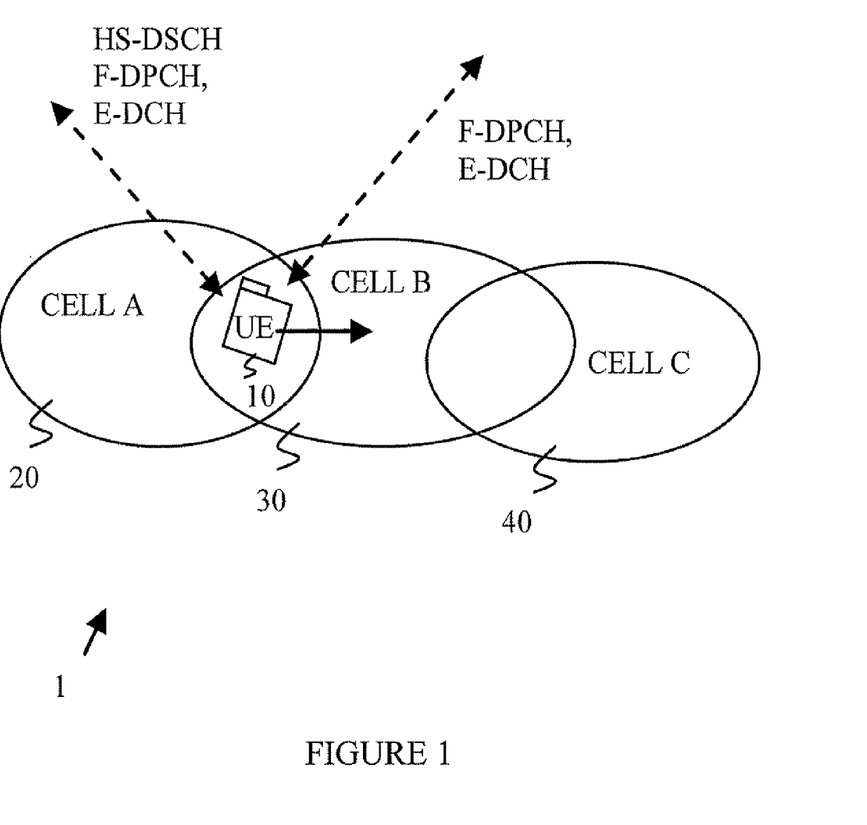
FIG. 1 is a block diagram illustrating an example of a cellular radio communications network system to which the present invention can be applied.
Figure 2:
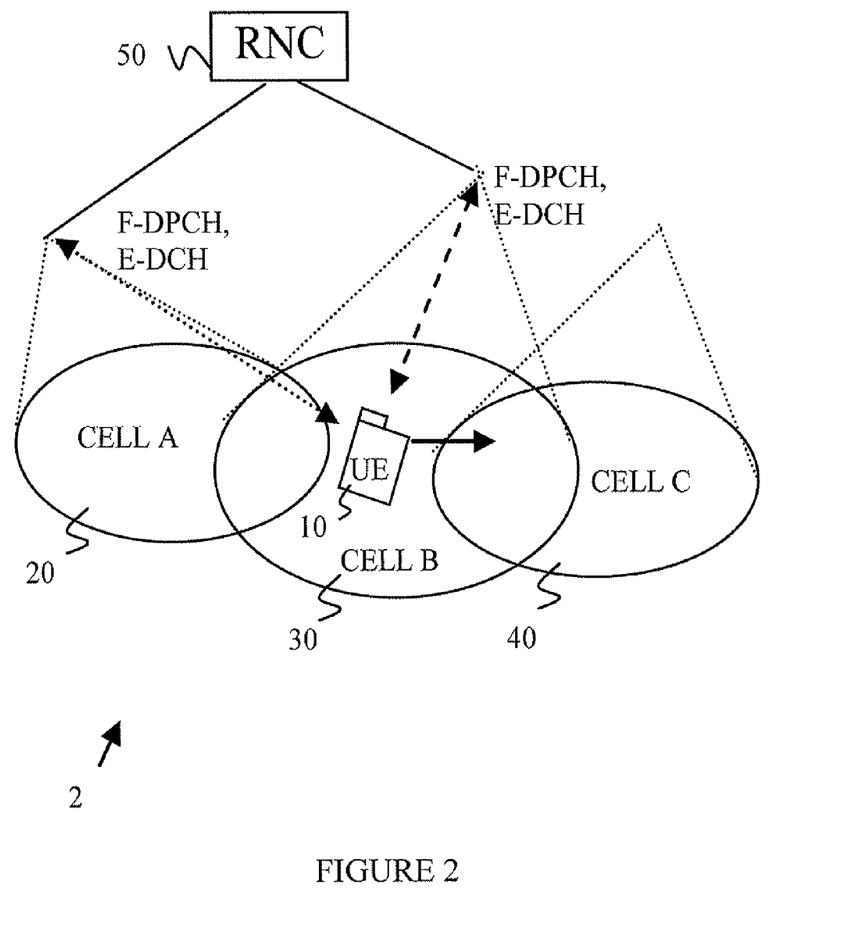
FIG. 2 schematically illustrates another example of a cellular radio communications network system to which the present invention can be applied.

FIG. 1 illustrates an example of a WCDMA cellular radio communications network system 1 comprising three cells Cell A 20, Cell B 30 and Cell C 40, and a moving UE 10. In FIG. 1, Cell A 20 and Cell B 30 are considered to be members in an Active Set of cells. Cell A 20 is in this exemplary network, the serving HS-DSCH serving cell for UE 10. The UE 10 is also here considered to have an uplink channel available. The uplink channel is, according to the present, considered to be a dedicated channel (DCH) or an enhanced dedicated channel (E-DCH). Note that in FIG. 1 only the E-DCH is illustrated, although the DCH may also be used. The UE 10 is further having a downlink F-DPCH available. According to the present invention, the downlink (DL) F-DPCH and the uplink (UL) E-DCH (or DCH) support macro-diversity, i.e. these channels support power control (uplink and downlink) and data transmission (uplink only) to/from multiple cells in the network. Referring back to FIG. 1, the F-DPCH and the E-DCH are, as illustrated, established to both cells Cell A 20 and Cell B 30, whereas the HS-DSCH is only established to the HS-DSCH serving cell, Cell A, 20. Due to the movement of UE 10 towards Cell B 30, the HS-DSCH serving cell, Cell A 20, needs to be changed to cell B (i.e. handing over UE 10 from Cell A 20 to Cell B 30). This procedure is network-controlled and can be based, as will be described, on measurement reports received from UE 10. As mentioned above Cell C 40 is not yet included in the Active Set of the UE 10. In a situation where the link conditions of the downlink from Cell A 20 degrades rapidly, it could happen that UE 10 loses contact with Cell A 20, i.e. loses its HS-DSCH from Cell A 20 before the HS-DSCH serving cell handover change command has been received by UE 10. UE 10 then ends up in the situation that is depicted in FIG. 2.

Thus the main problem in case UE 10 loses contact with Cell A is the loss of the downlink transport channel for carrying the signaling radio bearers (SRB) and data. In such a situation and in accordance with embodiments of the present invention, the UE 10 is still having the uplink transport channel (E-DCH or DCH) available. It should be noted that UE 10 is here considered to have enough power to power-control its uplink channel to the strongest cell in the Active Set. Principally, power control is performed by multiple cells; however, in effect it is performed by the strongest cell, which is Cell B 30 in FIG. 2. It should be noted that UE 10 also comprises an F-DPCH, but lacks a downlink transport channel. It should also be noted that if UE 10 moves further into Cell C 40, the inter-cell interference that will be generated in Cell C 40 can be substantial. This is because UE 10 will remain power-controlled towards the cells in the Active Set (i.e. Cell A 20 and Cell B 30) even in the case when UE 10 has moved very close to Cell C 40 uplink receiver.

Referring back to FIG. 2, as the UE 10 detects the loss of the HS-DSCH serving cell, Cell A 20, UE 10 uses its available uplink channel (E-DCH or DCH) to inform a network unit in network 1 or network 2 and to indicate the loss of the HS-DSCH serving cell, Cell A 20. According to embodiments of the present invention, the network unit also detects a failed transmission of a handover command sent on the HS-DSCH. The network unit may for example be (or be part of) a radio network controller (RNC), a radio network subsystem (RNS), a radio base station which is also known as Node B or some combination thereof. In FIG. 2, only the RNC 50 is illustrated although, as mentioned above, other network units may be used.

When the network unit detects the failed transmission of the handover command that is transmitted from the HS-DSCH serving cell 20 on the HS-DSCH and to UE 10, a radio resource control (RRC) message is sent from UE 10 to the network unit. As mentioned above, although UE 10 loses contact with the HS-DSCH serving cell, Cell A 20, UE 10 can still utilize its still available UL channel (E-DCH or DCH) to transmit the RRC message. According to an embodiment of the present invention, the network unit detects the failed transmission of the handover command by e.g. monitoring hybrid-automatic repeat request, HARQ, feedback transmissions that had been received from UE 10 and uses the HARQ feedback transmissions to decide that the transmission of the handover command has failed and moves into a state where a UE-triggered cell selection in CELL_DCH is allowed. A failed HARQ transmission for a SRB effectively means that the network unit (e.g. Node B) was unable to reach UE 10.

According to another exemplary embodiment of the present invention, repeated HARQ failures in the data transmission could be used as an indicator that there is problems with the downlink transmission, and would move the network into a state where it allows UE 10 to perform cell selection in the CELL_DCH state.

According to yet another exemplary embodiment of the present invention, the network unit may detect the failed transmission of the handover command by using reported channel quality indicator (CQI) values by UE 10 on a high-speed dedicated physical control channel (HS-DPCCH). This alternative embodiment could be used to ensure network control over the handover procedure during normal operation. It should be noted that depending on the measurement configuration, the measurements arrive more or less frequently. As a consequence, the execution of the HS-DSCH serving cell may be delayed.

As mentioned earlier, UE 10, which is still having a UL channel (E-DCH or DCH) available, detects the loss of the HS-DSCH serving cell, Cell A 20, prior to sending the RRC message. This detection could be triggered by one or several of, e.g. the following exemplary events: UE 10 cannot decode/receive a HS-SCCH/HS-DPSCH (high-speed shared control channel/high-speed dedicated physical shared channel); or a received C-PICH (common pilot channel) power from the HS-DSCH serving cell, Cell A 20, is lower than a predefined threshold (or certain value) for a predefined period of time. The C-PICH is used for estimating the CQI values. Thus when one of these triggers is fulfilled and there is a cell stronger than the current HS-DSCH serving cell in the monitored set, UE 10 sends the RRC message (e.g. a measurement report with a special cause value) to the network unit indicating the loss of the HS-DSCH serving cell Cell A 20.

According to exemplary embodiments of the present invention the RRC message (measurement report) is sent on the still available E-DCH (or DCH) since the uplink is power controlled within the Active Set (Cell A 20; Cell B 30).

Furthermore, and in accordance with embodiments of the present invention, the RRC message includes an indication of the strongest downlink cell perceived (measured) by UE 10.

Upon the reception of the RRC message, the network unit initiates a new HS-DSCH serving cell re-establishment to the strongest downlink cell indicated in the received RRC message (or measurement report) from UE 10. Thus, the network takes actions to re-establish the HS-DSCH transport channel in the new cell indicated in the RRC message. The network unit prepares a HS-DSCH reconfiguration message and transmits a RRC reconfiguration message to UE 10, where a new HS-DSCH serving cell is created. According to an embodiment of the present invention, the RRC reconfiguration message is sent by the network unit on a logical control channel (CCCH). This is because no HS-DSCH radio network temporary identifier (H-RNTI) has yet been allocated to UE 10 in the new cell. Depending on the UE capability, either a forward access channel (FACH) or the HS-DSCH in the target cell is used to carry the RRC reconfiguration message. According to an exemplary embodiment of the present invention, the CCCH is mapped on the forward access channel (FACH) according to current standard and in such case a universal terrestrial radio access network (UTRAN) radio network temporary identifier (U-RNTI), on the CCCH, is used to identify UE 10. This may result in higher bit rates and shorter transmission time interval (TTI) supported by the HS-DSCH, i.e. the procedure will be faster.

According to another exemplary embodiment of the present invention, the CCCH can be mapped on the HS-DSCH by broadcasting on broadcast channel (BCH) information on how UE 10 can read the CCCH on the HS-DSCH from the BCH in the target cell and UE 10 starts monitoring the HS-SCCH for CCH traffic. A specific (broadcast) H-RNTI can then be used to identify the CCCH channel on the HS-DSCH.

As UE 10 receives from the network unit, the RRC reconfiguration message (HS-DSCH reconfiguration message) which includes the new HS-DSCH configuration for UE 10, including a new H-RNTI, UE 10 can, according to embodiments of the present invention, continue normal operation in the new HS-DSCH serving cell which is Cell B 30 in FIG. 1 or FIG. 2.

Therefore, in accordance with the present invention, the mechanism described above provides a faster recovery of UE 10 after a failed handover execution thus avoiding a loss of the connection since the downlink transport channel is re-established. In addition, a reduction of the inter-cell interference of UE 10 that has lost its HS-DSCH serving cell Cell A 20 is achieved since a fast recovery has been accomplished using the mechanism described above in accordance with the embodiments of the present invention.

Figure 3:
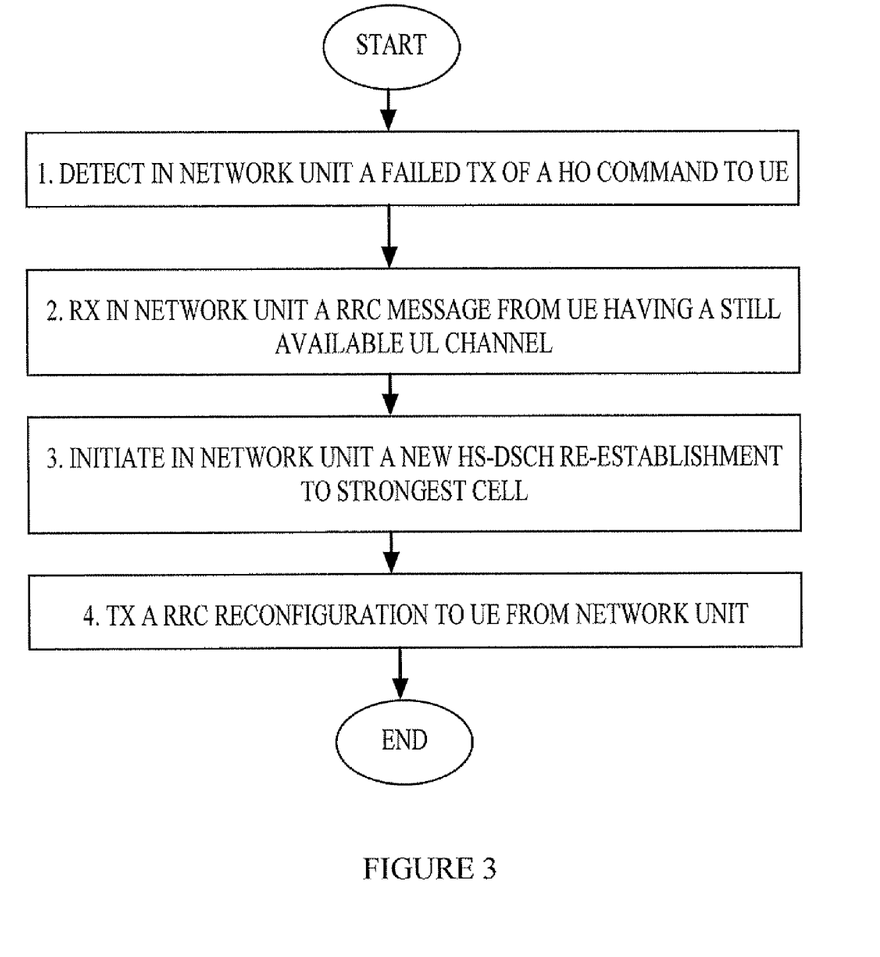
FIG. 3 illustrates a flowchart of a method according to exemplary embodiments of the present invention.

FIG. 3 illustrates a flowchart of a method according to the above described exemplary embodiment of the present invention.

As illustrated, the method starts according to the followings steps:

step 1. A network unit detects a failed transmission of a handover (HO) command from a HS-DSCH serving cell to a UE. The HO command is transmitted on the HS-DSCH.

step 2. The network unit receives, from the UE which is still having an uplink channel available, a RRC message indicating a loss of the HS-DSCH serving cell and further indicating the strongest downlink cell perceived by the UE.

step 3. The network unit initiates a new HS-DSCH serving cell re-establishment to the indicated strongest downlink cell.

step 4. The network unit transmits a RRC reconfiguration message to the UE.

Upon reception of the RRC reconfiguration message, the UE can continue normal operation in the new HS-DSCH cell and the method ends.

Figure 4:
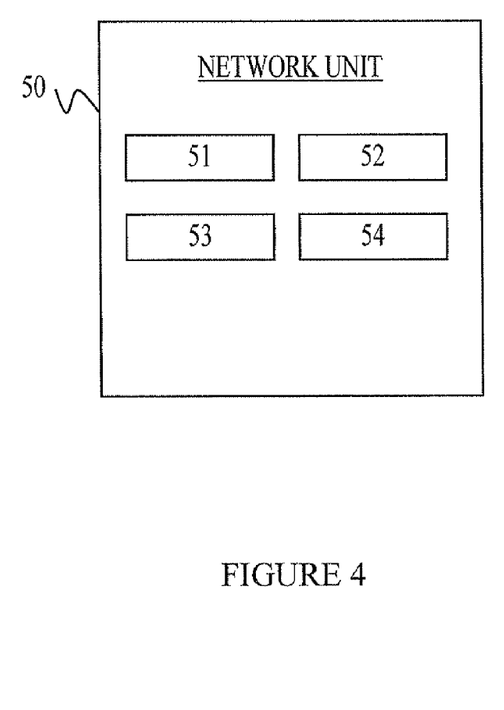
FIG. 4 is a schematic block diagram of an exemplary embodiment of a network unit in accordance with an exemplary embodiment of the present invention.

Referring to FIG. 4 there is illustrated a schematic block diagram of an exemplary embodiment of a network unit 50 in accordance with an exemplary embodiment of the present invention. As mentioned earlier the network unit 50 may be a RNC, RNS, a Node B or some combinations thereof.

In FIG. 4, the network unit 50 comprises:

means 51 for detecting a failed transmission of a handover command transmitted on a HS-DSCH, to a UE which is still having an uplink channel available;

means 52 for receiving from a UE, an uplink radio resource control, RRC, message indicating a loss of the HS-DSCH serving cell and further indicating the strongest downlink cell perceived by the UE;

means 53 for initiating a new HS-DSCH serving cell re-establishment to the indicated strongest downlink cell; and means 54 for providing a RRC reconfiguration message to the UE.

Note that the network unit 50 may comprise other means. In addition the different means of the network unit are not necessarily separated.

Figure 5:
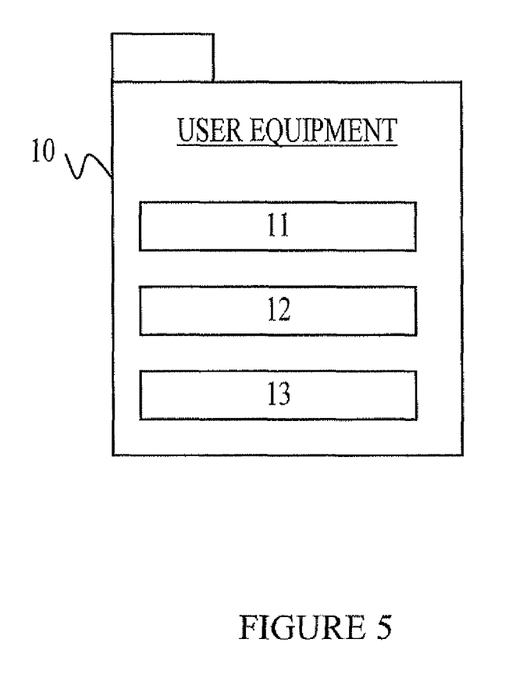
FIG. 5 is a schematic block diagram of an exemplary embodiment of a user equipment in accordance with an exemplary embodiment of the present invention.

Referring to FIG. 5 there is illustrated a schematic block diagram of an exemplary embodiment of a user equipment 10 in accordance with an exemplary embodiment of the present invention.

In FIG. 5, the user equipment 10 which is considered to still have an uplink channel available and which is configured to perform a handover from a serving HS-DSCH cell to a second cell, comprises:

means 11 for detecting a loss of the HS-DSCH serving cell;

means 12 for providing to a network unit a RRC message indicating the loss of the HS-DSCH serving cell and further indicating the strongest downlink cell perceived by the UE; and means 13 for receiving a RRC reconfiguration message from the network unit.

Similarly to the network unit 50, UE 10 may also comprise other means. In addition the different means of UE 10 are not necessarily separated.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention

The invention claimed is:

1. A method performed in a cellular radio communications network having a plurality of cells and at least one user equipment (UE), said network comprising at least one network unit configured to provide a high-speed downlink shared channel (HS-DSCH) to said at least one UE in said cells, said method comprising:

providing an uplink channel to the UE, the uplink channel comprising a dedicated channel (DCH) or an enhanced dedicated channel (E-DCH);

thereafter detecting, in said network unit, a failed transmission of a handover command sent by a HS-DSCH serving cell to a UE transmitted on said HS-DSCH, wherein the uplink channel is still available to the UE;

receiving, in said network unit, a radio resource control (RRC) message transmitted on the still available uplink channel from said UE via a different cell, wherein the RRC message indicates a loss of said HS-DSCH serving cell and a strongest downlink cell perceived by said UE;

initiating a new HS-DSCH serving cell re-establishment procedure to said strongest downlink cell indicated in said RRC message; and transmitting a RRC reconfiguration message from said network unit to said UE;

wherein the detecting comprises:

monitoring, by said network unit, hybrid-automatic repeat request (HARQ) feedback transmissions received from said UE; and using a HARQ feedback transmission indicative of a failed downlink transmission to determine whether said transmission of said handover command has failed.

2. A method performed in a cellular radio communications network having a plurality of cells and at least one user equipment (UE), said network comprising at least one network unit configured to provide a high-speed downlink shared channel (HS-DSCH) to said at least one UE in said cells, said method comprising:

providing an uplink channel to the UE, the uplink channel comprising a dedicated channel (DCH) or an enhanced dedicated channel (E-DCH);

thereafter detecting, in said network unit, a failed transmission of a handover command sent by a HS-DSCH serving cell to a UE transmitted on said HS-DSCH, wherein the uplink channel is still available to the UE;

receiving, in said network unit, a radio resource control (RRC) message transmitted on the still available uplink channel from said UE via a different cell, wherein the RRC message indicates a loss of said HS-DSCH serving cell and a strongest downlink cell perceived by said UE;

initiating a new HS-DSCH serving cell re-establishment procedure to said strongest downlink cell indicated in said RRC message; and transmitting a RRC reconfiguration message from said network unit to said UE;

wherein said detecting that said transmission of said handover command has failed comprises detecting the failed transmission responsive to repeated HARQ feedback transmissions transmitted from said UE indicative of failed downlink transmissions.

3. The method of claim 1 wherein said uplink channel still available to the UE is power controlled, and used to communicate data transmissions in the uplink with multiple cells in said cellular radio communications network system.

4. The method of claim 1 further comprising using said DCH or said E-DCH to send said message indicating the loss of said HS-DSCH serving cell, from said UE to said network unit, wherein said message indicates the strongest downlink cell perceived by said UE.

5. The method of claim 1 wherein said RRC message indicating a loss of said HS-DSCH serving cell by said UE is received when said UE is unable to decode or receive a high-speed shared control channel (HS-SCCH) received from the HS-DSCH serving cell.

6. The method of claim 1 wherein initiating said new HS-DSCH serving cell re-establishment comprises the network unit preparing said RRC reconfiguration message based on said strongest downlink cell reported by said UE, wherein said strongest downlink cell is indicated as a new HS-DSCH serving cell.

7. The method of claim 1 wherein said RRC reconfiguration message is transmitted from said network unit to said UE on a logical common control channel (CCCH) that is mapped on a forward access channel (FACH).

8. The method of claim 7 further comprising using a universal terrestrial radio access network (UTRAN) radio network temporary identifier (U-RNTI) on said CCCH to identify said UE.

9. The method of claim 1 wherein said RRC reconfiguration message is transmitted from said network unit to said UE on a logical common control channel (CCCH) that is mapped on a HS-DSCH by broadcasting information on a broadcast channel (BCH) defining how said UE can read said CCCH on the HS-DSCH.

10. The method of claim 9 further comprising identifying the CCCH on the HS-DSCH using a specific HS-DSCH radio access network temporary identifier (H-RNTI).

11. The method of claim 1 further comprising continuing by said UE, normal operation in said new HS-DSCH serving cell upon receiving said RRC reconfiguration message.

12. A user equipment (UE) in a cellular radio communications network system having a plurality of cells and at least one network unit configured to provide a high-speed downlink shared channel (HS-DSCH) to said UE in said cells, the UE comprising:

a detector configured to detect a loss of said HS-DSCH serving cell serving said UE;

a transmitter configured to transmit an uplink radio resource control (RRC) message to said network unit via a different cell over an uplink channel that was available to the UE prior to loss of the HS-DSCH serving cell and that continues to be available to the UE, the still available uplink channel comprising a dedicated channel (DCH) or an enhanced dedicated channel (E-DCH), the RRC message indicating said loss of said HS-DSCH serving cell and the strongest downlink cell perceived by said UE; and a receiver configured to receive a RRC reconfiguration message from said network unit;

wherein the transmitter is further configured to send a hybrid-automatic repeat request (HARQ) feedback transmission to said network unit to indicate a failed downlink transmission, based on which the network unit can determine that the handover command has failed to reach the UE.

13. A user equipment (UE) in a cellular radio communications network system having a plurality of cells and at least one network unit configured to provide a high-speed downlink shared channel (HS-DSCH) to said UE in said cells, the UE comprising:

a detector configured to detect a loss of said HS-DSCH serving cell serving said UE;

a transmitter configured to transmit an uplink radio resource control (RRC) message to said network unit via a different cell over an uplink channel that was available to the UE prior to loss of the HS-DSCH serving cell and that continues to be available to the UE, the still available uplink channel comprising a dedicated channel (DCH) or an enhanced dedicated channel (E-DCH), the RRC message indicating said loss of said HS-DSCH serving cell and the strongest downlink cell perceived by said UE; and a receiver configured to receive a RRC reconfiguration message from said network unit;

wherein the transmitter is further configured to transmit repeated HARQ transmissions to said network unit indicative of failed downlink transmissions, based on which said network unit can decide that a handover command has failed to reach said UE.

14. The UE of claim 12 wherein the transmitter is further configured to maintain said uplink channel available, wherein said uplink channel is power controlled and configured to use said uplink channel to communicate data to and from multiple cells of the network via the uplink channel.

15. The UE of claim 12 wherein the still available uplink channel is used by said transmitter to send said message indicating the loss of the HS-DSCH serving cell.

16. The UE of claim 12 wherein the UE is configured to trigger the sending of the RRC message when the UE is unable to decode or receive a high-speed shared control channel (HS-SSCH) received from the HS-DSCH serving cell.

17. The UE of claim 12 further comprising a receiver configured to receive said RRC reconfiguration message from said network unit on a logical common control channel (CCCH) that is mapped on a forward access channel (FACH), wherein said strongest downlink cell is indicated as said new HS-DSCH serving cell.

18. The UE according of claim 12 wherein a universal terrestrial radio access network (UTRAN) radio network temporary identifier (U-RNTI) on said CCCH is used to identify said UE.

19. The UE of claim 17 wherein said receiver is configured to:

receive said RRC reconfiguration message on a common control channel (CCCH) being mapped on the HS-DSCH; and receive on a broadcast channel (BCH) a specific HS-DSCH radio access network temporary identifier (H-RNTI) which is used by said UE to read said CCCH on the HS-DSCH.

20. The UE of claim 12 wherein the transmitter is further configured to communicate normally via said new HS-DSCH serving cell upon reception of said RRC reconfiguration message.

21. A network unit in a cellular radio communications network system having a plurality of cells, the network unit being configured to provide a high-speed downlink shared channel (HS-DSCH) to at least one user equipment (UE) being served by a HS-DSCH serving cell, the network unit comprising:

a detector configured to detect a failed transmission of a handover command transmitted on said HS-DSCH, to a UE for which a previously available uplink channel is still available, wherein the still available uplink channel comprises a dedicated channel (DCH) or an enhanced dedicated channel (E-DCH);

a receiver configured to receive from said UE via a different cell an uplink radio resource control (RRC) message transmitted on the still available uplink channel indicating a loss of said HS-DSCH serving cell and further indicating the strongest downlink cell perceived by said UE;

an initiator configured to initiate a new HS-DSCH serving cell re-establishment to said indicated strongest downlink cell; and a transmitter configured to transmit a RRC reconfiguration message to said UE;

wherein the detector is configured to monitor hybrid-automatic repeat request (HARQ) feedback transmissions received from said UE and to use a HARQ feedback transmission indicative of a failed downlink transmission to decide that said transmission of said handover command has failed.

22. A network unit in a cellular radio communications network system having a plurality of cells, the network unit being configured to provide a high-speed downlink shared channel (HS-DSCH) to at least one user equipment (UE) being served by a HS-DSCH serving cell, the network unit comprising:

a detector configured to detect a failed transmission of a handover command transmitted on said HS-DSCH, to a UE for which a previously available uplink channel is still available, wherein the still available uplink channel comprises a dedicated channel (DCH) or an enhanced dedicated channel (E-DCH);

a receiver configured to receive from said UE via a different cell an uplink radio resource control, (RRC) message transmitted on the still available uplink channel indicating a loss of said HS-DSCH serving cell and further indicating the strongest downlink cell perceived by said UE;

an initiator configured to initiate a new HS-DSCH serving cell re-establishment to said indicated strongest downlink cell; and a transmitter configured to transmit a RRC reconfiguration message to said UE;

wherein said detector is configured to determine that said transmission of the handover command has failed when repeated HARQ feedback transmissions are received from the UE indicative of failed downlink transmissions.

23. The network unit of claim 21 wherein the initiator is configured to prepare said RRC reconfiguration message based on said strongest downlink cell reported by said UE.

24. The network unit of claim 21 wherein the transmitter is configured to transmit said RRC reconfiguration message to said UE on a logical common control channel (CCCH) mapped on a forward access channel (FACH), and identify said UE using a universal terrestrial radio access network (UTRAN) radio network temporary identifier (U-RNTI) on said CCCH.

25. The network unit of claim 21 wherein the transmitter is further configured to:
- transmit said RRC reconfiguration message to said UE on a logical common control channel (CCCH) that is mapped on a HS-DSCH; and
- broadcast on a broadcast channel (BCH) information on how said UE can read said CCCH on the HS-DSCH; and
- wherein said information is a specific HS-DSCH radio access network temporary identifier (H-RNTI).

* * * * *

UNITED STATES PATENT AND TRADEMARK OFFICE
CERTIFICATE OF CORRECTION

PATENT NO. : 8,644,252 B2  
APPLICATION NO. : 12/438795  
DATED : February 4, 2014  
INVENTOR(S) : Wager et al.

Page 1 of 1

It is certified that error appears in the above-identified patent and that said Letters Patent is hereby corrected as shown below:

In the Specification:

In Column 3, Lines 60-61, delete "cells Cell" and insert -- cells, Cell --, therefor.

In Column 4, Line 10, delete "cells Cell" and insert -- cells, Cell --, therefor.

In Column 4, Line 11, delete "Cell A, 20." and insert -- Cell A 20. --, therefor.

In Column 5, Line 38, delete "cell Cell" and insert -- cell, Cell --, therefor.

In Column 6, Line 8, delete "CCH" and insert -- CCCH --, therefor.

In Column 6, Line 24, delete "cell Cell" and insert -- cell, Cell --, therefor.

In Column 7, Line 29, delete "invention" and insert -- invention. --, therefor.

In the Claims:

In Column 9, Line 57, in Claim 16, delete "(HS-SSCH)" and insert -- (HS-SCCH) --, therefor.

In Column 10, Line 56, in Claim 22, delete "control," and insert -- control --, therefor.

Signed and Sealed this  
Twenty-second Day of July, 2014

Michelle K. Lee  
*Deputy Director of the United States Patent and Trademark Office*